| (12) United States Patent | (10) Patent No.: US 8,004,693 B2 |
| Kanno et al. | (45) Date of Patent: Aug. 23, 2011 |

(54) LENS HOLDER AND LENS SHAPE MEASURING APPARATUS

(75) Inventors: Kenichi Kanno, Itabashi-ku (JP); Kenji Miyashita, Itabashi-ku (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 88 days.

(21) Appl. No.: 12/382,961

(22) Filed: Mar. 27, 2009

(65) Prior Publication Data

US 2009/0244525 A1    Oct. 1, 2009

(30) Foreign Application Priority Data

Mar. 28, 2008    (JP) .................................. 2008-088199

(51) Int. Cl.
    *G01B 11/24*    (2006.01)
(52) U.S. Cl. .......................... 356/601; 356/124; 356/244
(58) Field of Classification Search .................. 356/601, 356/124, 244
    See application file for complete search history.

(56) References Cited

U.S. PATENT DOCUMENTS

| 3,769,755 | A * | 11/1973 | Kania et al. .................... 451/239 |
| 6,409,574 | B1 * | 6/2002 | Shibata ............................. 451/5 |
| 6,497,482 | B1 * | 12/2002 | Matsuyama .................... 351/41 |
| 6,785,585 | B1 * | 8/2004 | Gottschald .................... 700/159 |
| 6,918,822 | B2 * | 7/2005 | Arai et al. ........................ 451/42 |
| 6,984,161 | B2 * | 1/2006 | Suzuki et al. ..................... 451/5 |
| 2003/0182813 | A1 | 10/2003 | Suzuki et al. |

FOREIGN PATENT DOCUMENTS

| EP | 0 881 037 | 12/1998 |
| JP | 04-012215 | 1/1992 |
| JP | 10-156685 | 6/1998 |
| JP | 3602175 | 10/2004 |
| JP | 3989593 | 7/2007 |

OTHER PUBLICATIONS

European Search Report issued Nov. 10, 2010 in European Patent Application No. 09 15 6485.

\* cited by examiner

*Primary Examiner* — Tarifur R. Chowdhury
*Assistant Examiner* — Isiaka O Akanbi
(74) *Attorney, Agent, or Firm* — Wenderoth, Lind & Ponack, L.L.P.

(57) ABSTRACT

A lens holder includes a lens holding member having a mounting shaft portion and is configured to hold a lens provided with at least one hole mounting a fitting for a rimless frame or a dummy lens provided with at least one hole, a main body including an opened bottom surface, a shaft holding cylinder provided in the main body and configured to hold the mounting shaft portion of the lens holding member, a clamping member configured to clamp the shaft holding cylinder to the mounting shaft portion of the lens holding member, and at least one confirming hole provided in the main body. When the shaft holding cylinder is clamped to the mounting shaft portion of the lens holding member by the clamping member, the confirming hole is configured to allow the hole of the lens or the dummy lens to be viewed.

4 Claims, 14 Drawing Sheets

US 8,004,693 B2

LENS HOLDER AND LENS SHAPE MEASURING APPARATUS

CROSS-REFERENCE TO THE RELATED APPLICATION

This application is based on and claims the priority benefit of Japanese Patent Application No. 2008-088199, filed on Mar. 28, 2008, the disclosure of which is incorporated herein by reference in its entirety.

BACKGROUND OF THE INVENTION

1. Field of the Invention

The present invention relates to a lens holder capable of confirming a mounted state of a lens and a lens shape measuring apparatus using the lens holder and configured to measure a lens shape such as a lens shape of an eyeglass frame, a shape of a demo lens, a template for a lens, or the like.

2. Description of the Related Art

There is conventionally known a lens holder used for holding a lens, a template, a demo lens or the like when measuring a shape of the lens and so on, or used for holding an eyeglass lens between a pair of lens rotating shafts of a lens contour processing apparatus when grinding the eyeglass lens.

As the lens holder, there exists a flange type lens holder in which a flange, for example, an elongate egg-shaped flange is integrally provided on one end of a shaft portion, or a lens absorbing jig (absorbing cup) in which a rubber cup is integrally provided on one end of a shaft portion.

As this flange-type lens holder, there is known an adhesive-type lens holder in which the lens shape is adhered to the flange by a double-faced adhesive tape, or a screw fixing-type lens shape in which a positioning pin provided on the flange is engaged in a positioning hole of a template and the template is fixed to the flange by means of a fixing screw inserted into a center hole of the template. Meanwhile, in the lens absorbing jig, the lens can be held on the shaft portion by absorbing the lens to a rubber cup.

By the way, there is known a lens shape measuring apparatus in which a shaft portion of a lens holding member configured to hold a lens is fitted in a cylinder or engaging tube portion of a lens holder. The lens holder is set to the lens shape measuring apparatus in such a manner that the lens is located downward, a circumferential edge of the lens is measured by a measuring element from below, and lens shape data (lens shape information) for processing a contour of the eyeglass lens is obtained (for reference, see Japanese Patent No. 3602175, FIG. 10).

In addition, there is conventionally known a lens shape measuring apparatus for an eyeglass lens frame wherein, for example, a lens is attached to a lens absorbing jig. A cylinder or engaging tube portion of a lens holder is clamped to a shaft portion of a lens absorbing jig by means of a circular clamping member provided on the lens holder. The lens is located downward and thus the lens holder is set to the apparatus, a circumferential edge of the lens is measured by a measuring element from below, and lens shape information for processing an eyeglass lens (lens shape information) is obtained (for reference, see Japanese Patent No. 3989593, FIG. 6).

However, in the aforementioned lens shape measuring apparatus, if the shaft portion of the lens holder by which the lens is held is engaged in the cylinder or engaging tube portion without providing a clamping member in the lens holder, since the engaging tube portion of the lens holder is directed downward, in the case that an engaging state of the shaft portion to the engaging tube portion is loose, when measuring the lens shape contour by abutting the measuring element against the circumference edge of the lens, the lens holding member and the lens are out of place from the engaging tube portion of the lens holder, there is a problem that the lens shape contour cannot be correctly measured.

Further, a lens can be shaped like an elongate crab eye having a short height (crab eye-like lens shape) such as a recent rimless frame in which holes for mounting metal fittings are formed. In the case that a lens shape as mentioned above is measured by the lens shape measuring apparatus, if the lens like the elongate crab eye (crab eye-like lens shape) is attached to a normal lens holding member, the positions of the holes are hidden, so that there is a possibility that the positions of the holes cannot be correctly detected.

Accordingly, if the positions of the holes cannot be correctly detected, since there are no data concerning the positions of the holes of the lens, the circumferential edge of the eyeglass is processed by the lens processing apparatus based upon the above-mentioned lens shape information. After the finishing process of the thus ground eyeglass, when forming the holes in the eyeglass, there has been a possibility that the holes are formed in wrong positions.

Furthermore, in the above-mentioned lens shape measuring apparatus, since the clamping member of the lens is circular in shape, such as a recent rimless frame, if the lens like the elongate crab eye having a short height (crab eye-like lens shape) is attached to the lens of a normal lens holding member, the positions of the holes cannot be detected. Since the positions of the holes cannot be correctly recognized, after the finishing process of the thus ground eyeglass, when forming holes in the eyeglass, there has been a possibility that the holes would be formed in wrong positions.

SUMMARY OF THE INVENTION

An object of the present invention is to provide a lens holder and a lens shape measuring apparatus using the lens holder and enabling the user to look at positions of holes of a lens in the face. The apparatus is adapted to correctly perform the detection of the positions of the holes for automatically measuring the positions of the holes.

To accomplish the above object, a lens holder according to one embodiment of the present invention includes a lens holding member having a mounting shaft portion and configured to hold a lens provided with at least one hole mounting a fitting for a rimless frame or a dummy lens provided with at least one hole, a main body including an opened bottom surface, a shaft holding cylinder provided in the main body and configured to hold the mounting shaft portion of the lens holding member, a clamping member configured to clamp the shaft holding cylinder to the mounting shaft portion of the lens holding member, and at least one confirming hole provided in the main body.

When the shaft holding cylinder is clamped to the mounting shaft portion of the lens holding member by the clamping member, the confirming hole is configured to look at the hole of the lens or the dummy lens.

DETAILED DESCRIPTION OF THE PREFERRED EMBODIMENTS

Preferred Embodiments of the present invention will be described in detail hereinafter with reference to the accompanying drawings.

Figure 2:
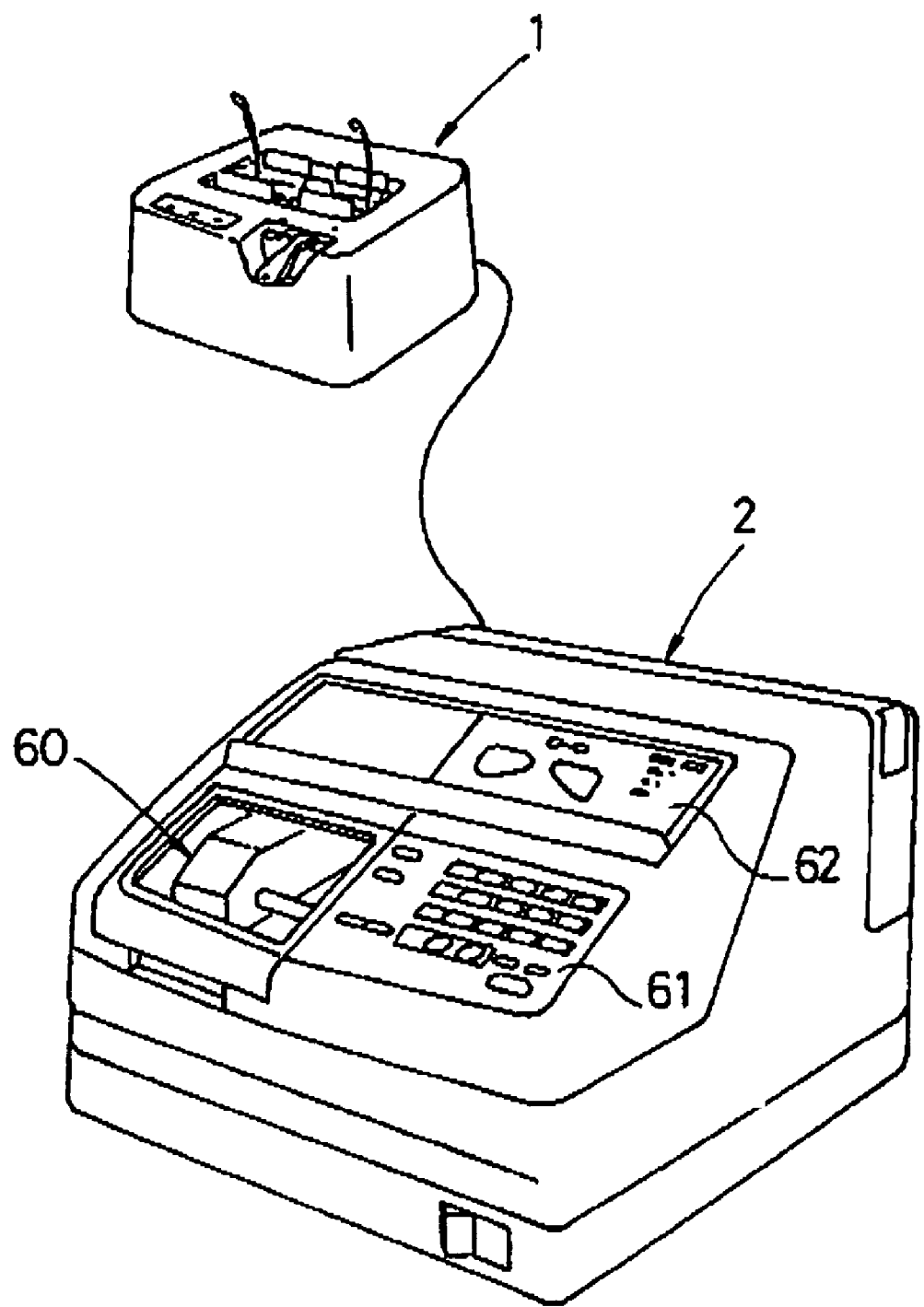
FIG. 2 is a perspective view showing the relationship between the lens shape measuring apparatus of the eyeglass frame shown in FIG. 1A and a grinding apparatus.

In FIG. 2, reference numeral 1 denotes a lens shape measuring apparatus according to an embodiment of the present invention and reference 2 a grinding apparatus (lens processing apparatus) connected to the lens shape measuring apparatus 1. The lens shape measuring apparatus is configured to measure a shape of a lens to be processed and obtain eyeglass frame-contour data. The grinding apparatus is configured to grind a lens material to be processed into a finished eyeglass lens, based on the eyeglass-contour data obtained from the lens shape apparatus 1.

Figure 3:
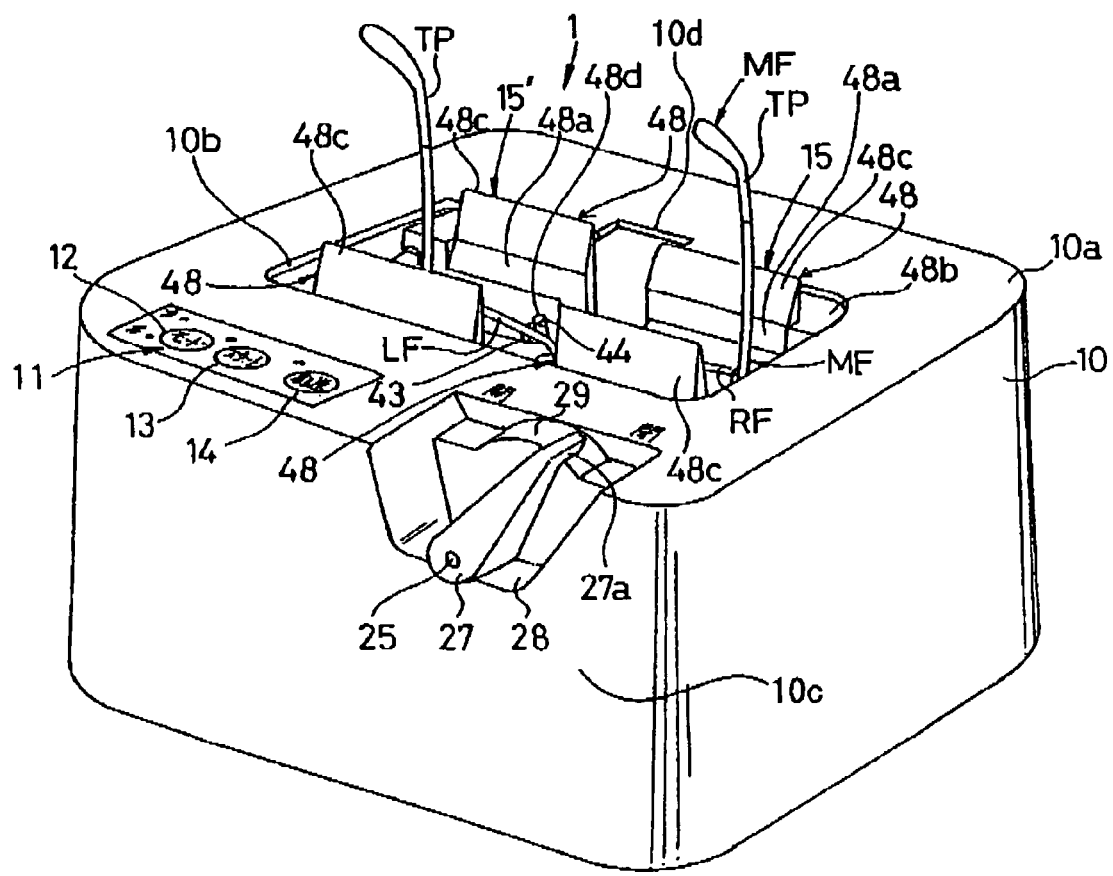
FIG. 3 is an enlarged perspective view of the lens shape measuring apparatus shown in FIG. 2.

As shown in FIG. 3, the lens shape measuring apparatus 1 includes an apparatus body 10 having an opening 10b in the middle of an upper surface 10a and a switch portion (operation panel) 11 mounted on the upper surface 10a of the body 10. The switch portion 11 includes a mode changing switch 12 for changing over right and left measurement modes, a start switch 13 serving as a lens shape measurement starting device (frame template measurement starting device) and as a lens frame measurement starting device, and a transfer switch 14 for transferring data.

Figure 1:
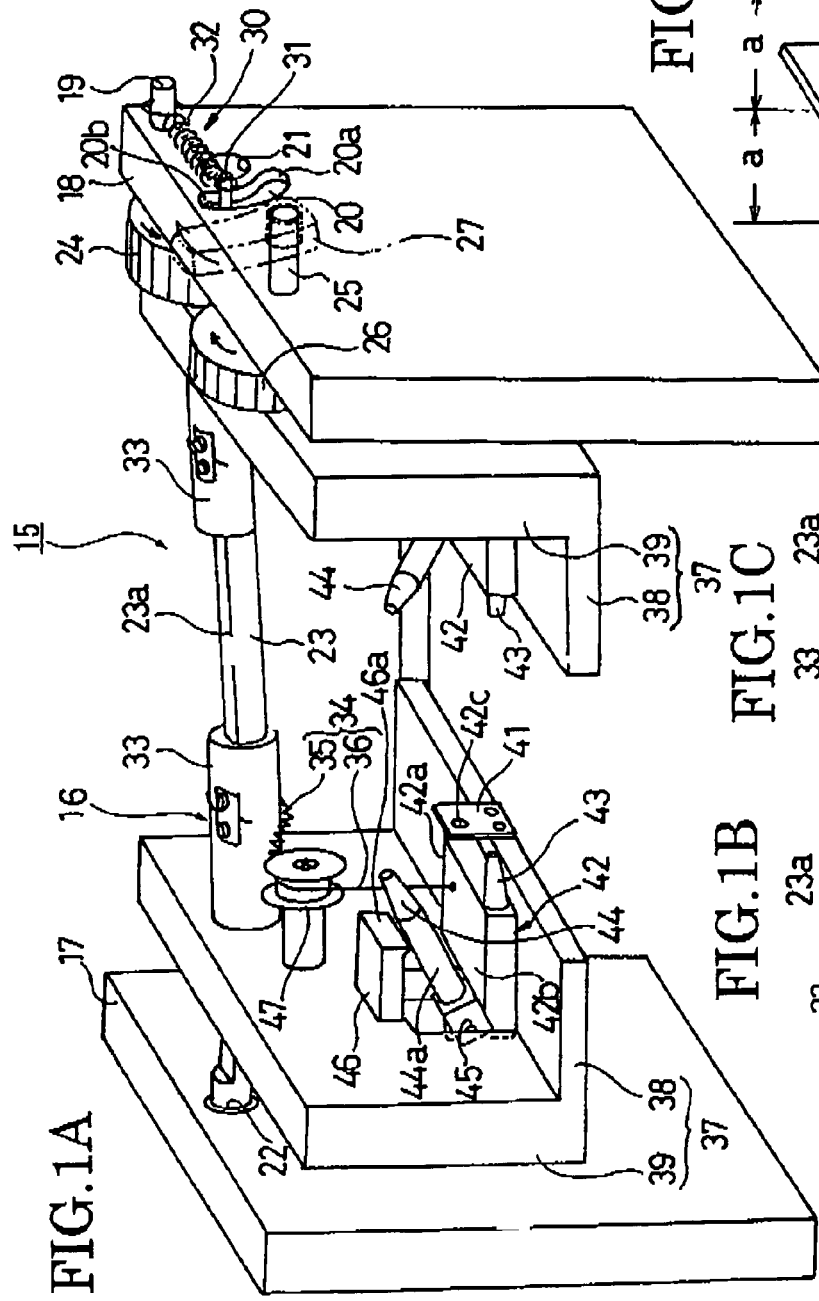
FIG. 1A is a perspective view of a lens shape measuring apparatus for an eyeglass according to an embodiment of the present invention.
FIGS. 1B and 1C are sectional views showing a relationship between a tube shaft and an operating shaft shown in FIG. 1A.
FIG. 1D is a perspective view of a holding claw.

The apparatus 1 further includes eyeglass frame holding mechanisms (lens holding member) 15, 15' for holding right and left lens frames LF, RF of the eyeglass frame MF of eyeglasses M as shown in FIG. 3, an operation mechanism 16 as shown in FIG. 1. Further, since each of the frame holding mechanisms 15, 15' as shown in FIG. 1 has the same structure, the former (first) frame holding mechanism 15 will be described with reference to FIG. 1 and thus description concerning the latter (second) frame holding mechanism 15' is omitted.

In addition, in FIG. 1, reference numerals 17 and 18 denote supporters which are fixed upward and downward to a chassis (not shown) within the body 10 of the apparatus and mounted in parallel to each other, reference numeral 19 denotes an engaging pin projecting from an outside surface (a surface opposite to the supporter 17) of the supporter 18, reference numeral 20 denotes an arc-shaped slit provided in an upper end portion of the supporter 18, and reference numerals 21 and 22 denote mounting holes formed in the supporters 17 and 18. The circular slit 20 is concentric with the mounting hole 22. These mounting holes 21, 22 are located between the arc-shaped slit 20 and an engaging pin 19, and the arc-shaped slit 20 is formed in a concentric manner with the mounting holes 21, 22.

(Operation Mechanism 16)

The operation mechanism 16 includes an operation shaft 23 rotatably held in the mounting holes 21, 22 of the supporters 17, 18, as shown in FIGS. 1A and 3, a driven gear 24 fixed to an end portion of the operation shaft 23 on the side of the supporter 18, a rotation shaft 25 passing through the supporter 18 and a front surface 10c of the body 10, a driving gear 26 fixed to an end portion of the rotation shaft 25 (or formed integrally with the rotation shaft 25) and engaged with the driving gear 24, and an operation lever 27 mounted on the other end portion of the rotation shaft 25. In the drawings, reference numeral 23a denotes a flat portion formed on the operation shaft 23 and extending close to the two end portions of the operation shaft 23.

In addition, as shown in FIG. 3, in the main body 10 of the apparatus is formed with a concave portion 28 extending from the front surface 10c to the upper surface 10a, and the concave portion 28a is formed with a circular projection 29. Signs "open" and "close" are provided in the upper surface 10a and are positioned on right and left sides of the projection 29, respectively. The lever 27 is disposed on a front surface of the concave portion 28, and a curved portion, namely, instruction portion 27a is mounted on an upper portion of the lever 27 and is movable on the projection 29. Furthermore, as shown in FIG. 3, the upper surface 10a is formed with a cut portion 10d which is located between the frame holding mechanisms 15, 15' and faces the opening 10b.

In addition, between the driven gear 24 and the engaging pin 19, frame maintenance (for in the "open") and a two-position holding mechanism 30 (two position holding device) to make possible frame maintenance cancellation (for in the "close") is provided.

The two-position holding mechanism 30 includes a circular slit 20, a movable pin 31 projecting from a side surface of the driving gear 24 and passing through the circular slit 20, and a spring 32 (tension coil spring) interposed between the movable pin 31 and the engagement pin 19. Since the circular slit 20 is concentric with the mounting hole 22, as mentioned above, the circular slit 20 is also concentric with the driven gear 24 and the operation shaft 23. For this reason, the movable pin 31 is held at one of two end portions 20a and 20b of the circular slit 20 by the spring 32.

The operation mechanism 16 further includes a pair of barrel shafts 33, 33 held such that the pair of barrel shafts 33, 33 are movable in a longitudinal direction of the operation shaft 23 and are slightly rotatable in a circumferential direction. Between a flat portion 33b of a cut-circular through-hole 33a of the barrel shaft 33 and the flat portion 23a of the operation shaft 23, a slight gap S is formed as shown in FIGS. 1B and 1C. On the barrel shafts 33, 33, string-like bodies 34 (only one is shown in FIG. 1A) are mounted, each of which includes a portion which is elastic because of its own elastic force. The string-like body 34 includes a spring (elastic portion) 35, an end of which is fixed to the barrel shaft 33 and a wire 36 connected to the other end of the spring 35.

(Frame Holding Mechanisms 15, 151)

The frame holding mechanism 15 includes a pair of movable supporters 37, 37 (sliders) held in the body 10, which are movable in a horizontal direction and are movable closer to (or away from) each other. Each of the movable supporters 37, 37 is shaped like the letter "L" which includes a horizontal plate portion 38 and a vertical plate portion 39 which vertically extends from an end of the horizontal plate portion 38. In the vertical plate portion 39, the barrel shaft 33 is held rotatably but cannot be moved in an axial direction.

The frame holding mechanism 15 further includes a tension coil spring 40 which is arranged between the horizontal plate portions 38, 38 of the movable supporters 37, 37 as shown in FIG. 4, a supporting plate 41 fixed in the center of a front end of the horizontal plate portion 38, and a claw mounting plate 42 interposed between the vertical plate portion 39 and a part of the supporting plate 41 which projects from the horizontal plate portion 38 upward. The claw mounting plate 42 is held by both the supporting plate 41 and the vertical plate portion 39 so as to be rotatable centering a shaft-shaped supporting projection 42c of a side portion 42a. Another shaft-like supporting projection of a rear side portion of the claw mounting plate 42 is not shown.

A tapered holding claw 43 projects from a front end of the other side portion 42b of the claw mounting plate 42 as a first holding bar, and a rear end portion 44a of a shaft-like holding claw 44 as a second holding bar is held rotatably on a rear end of the other side portion of the claw mounting plate 42 by a supporting shaft 45. The holding claw 44, of which a base is shaped like a square plate as shown in FIG. 1D and the front end portion is tapered, is rotatable (pivotable) on the supporting shaft 45 and is allowed to relatively approach the supporting claw 43 or recede therefrom. Additionally, the front end portion of the holding claw 44 and the claw mounting plate 42 are urged to be opened by a torsion spring (not shown) wound on the supporting shaft 45.

In the vertical plate portion 39, an "L"-shaped engagement claw 46 projects therefrom and is positioned above the holding claw 44. An edge-like claw 46a of a front end portion of the engagement claw 46 which extends downward is engaged with the supporting claw 44. Thus, when the other side portion 42b of the claw supporting plate 42 is rotated upward centering the side portion 42a, a space between the supporting claws 43 and 44 is narrowed by the torsion spring (not shown). As shown in FIG. 1D, the edge-shaped claw portion 46a of the engagement claw 46 is engaged with a middle portion of the holding claw 44. Between the engagement claw 46 and the barrel shaft 33, an idle pulley 47 is mounted which is rotatably attached to the vertical plate portion 39. The wire 36 is put on the idle pulley 47, and an end of the wire 36 is situated in a substantial center between the two side portions 42a, 42b and is fixed to the claw mounting plate 42.

Figure 4A:
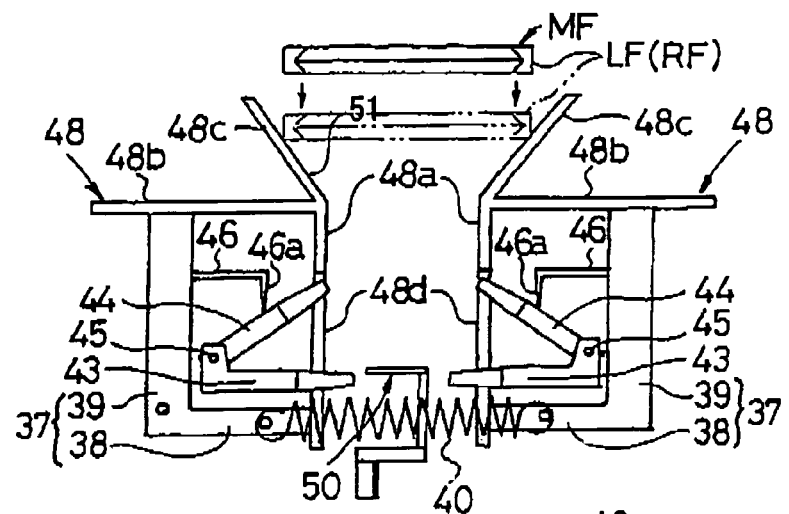
FIGS. 4A to 4C are explanatory views showing an operation when holding the eyeglass of the lens shape measuring apparatus shown in FIG. 1.
Figure 4B:
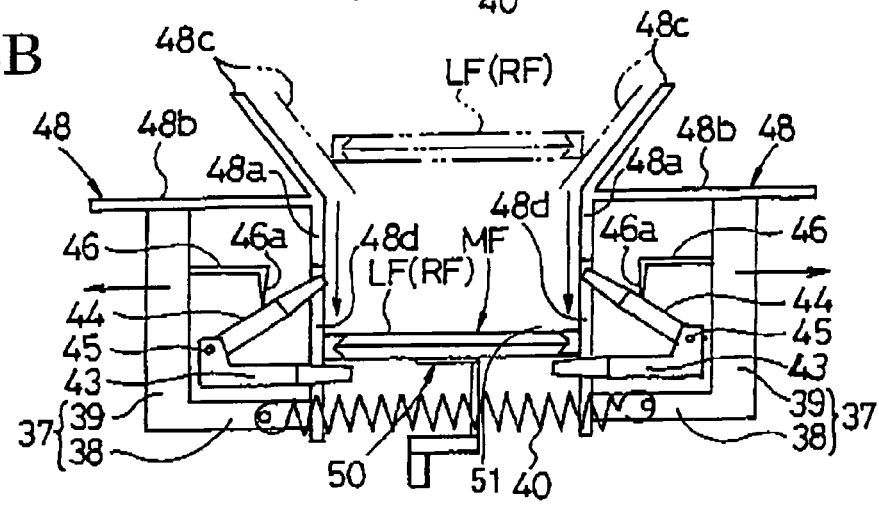

In addition, the movable supporters 37, 37 have two opposite sides which are covered with a frame guide member 48 shown in FIGS. 4A and 4B. The frame guide member 48 includes a vertical plate portion 48a fixed to a front end of the horizontal plate portion 38, a horizontal plate portion 48b fixed to an upper end of the vertical plate portion 39, and an inclined guide plate 48c connected to a corner, at which the plate portions 48a and 48b are connected to each other, and inclining to the horizontal plate portion 48b. In the vertical plate portion 48a, an aperture 48d is formed corresponding to the holding claws 43 and 44, and the holding claw 44 projects from the aperture 48d. Further, the front end portion of the holding claw 43 is to be positioned within the aperture 48d in an open state in which the holding claws 44 and 43 are widened at its maximum, as shown in FIGS. 4A and 4B.

Here, the vertical plate portions 48a, 48a of the frame guiding members 48, 48 extend in the direction perpendicular to the direction in which the movable frames 37, 37 move close to or away from one another. The vertical plate portions 48a, 48a are situated parallel to one another and sides on which they face one another correspond to holding surfaces. The holding surfaces of the pair of vertical plate portions 48a, 48a move close to and away from one another when the movable frames 37, 37 move close to or away from one another.

Further, the lens shape measuring apparatus 1 includes a lens shape measuring device (not shown) for measuring the contour of the rim of the eyeglass frame MF, that is, that of the lens frames LF, RF of the eyeglass frame MF. The lens shape measuring device is disposed in the lower part of the holding space. A measuring device, for example, a feeler 50 is moved along a groove 51 of an eyeglass frame F and thereby a position to which the feeler 50 has been moved is detected by detecting device (not shown). In this detecting operation, the lens-shaped measuring device calculates a radius pi from the geometrical center of a lens frame to the feeler 50 according to an angle θi at which the feeler 50 moves around the geometrical center. In other words, it can calculate lens contour information (θi, ρi) on the geometrical center in the polar coordinates form. Since well-known art can be applied to this structure, a further detailed explanation thereof is omitted.

Further, as shown in FIG. 2, the lens grinder 2 includes a processing portion 60 (not shown in detail) for grinding the rim of a lens T to be processed. In the processing portion 60, the lens is held between a pair of lens rotational shafts of a carriage, the rotation of the lens rotational shafts and the pivotal up and down movement of the carriage is controlled according to the lens contour information (θi, ρi), and the rim of the lens is ground with a rotating grindstone. Since this structure is well known, a detailed explanation thereof is omitted.

<Lens Holder 100>

Figure 5A:
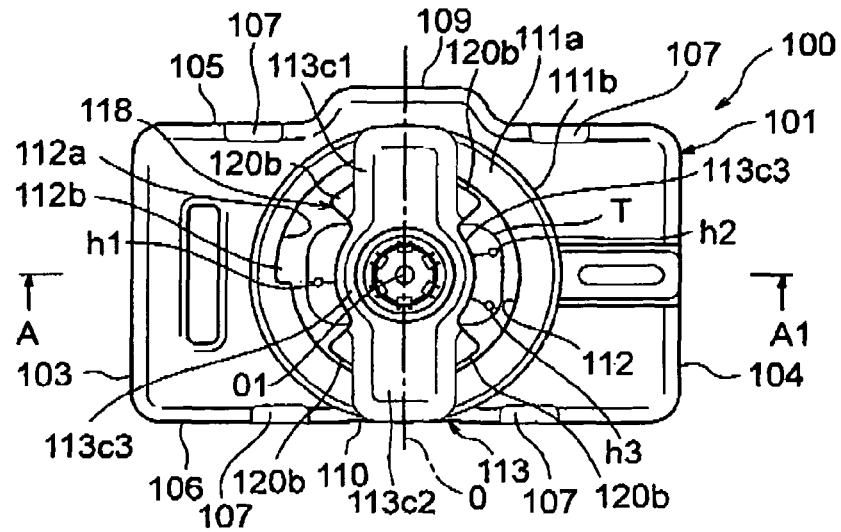
FIGS. 5A to 5C are plan views of the lens holder according to this invention.
Figure 5B:
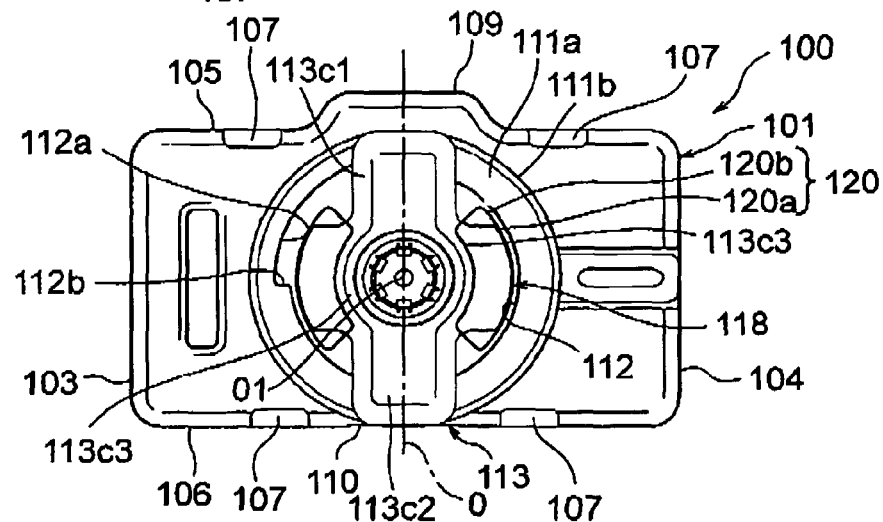
Figure 5C:
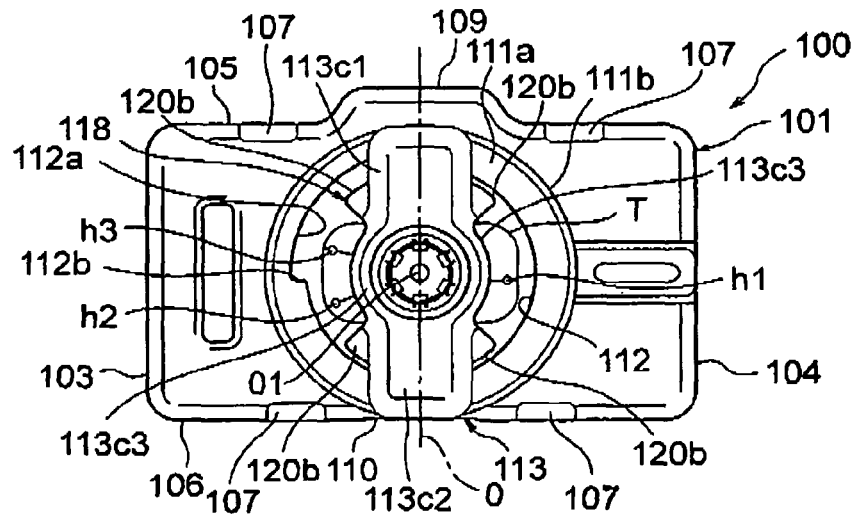

Here, FIGS. 5A to 5C respectively show a lens holder 100 with a bottom thereof opened.

Figure 6:
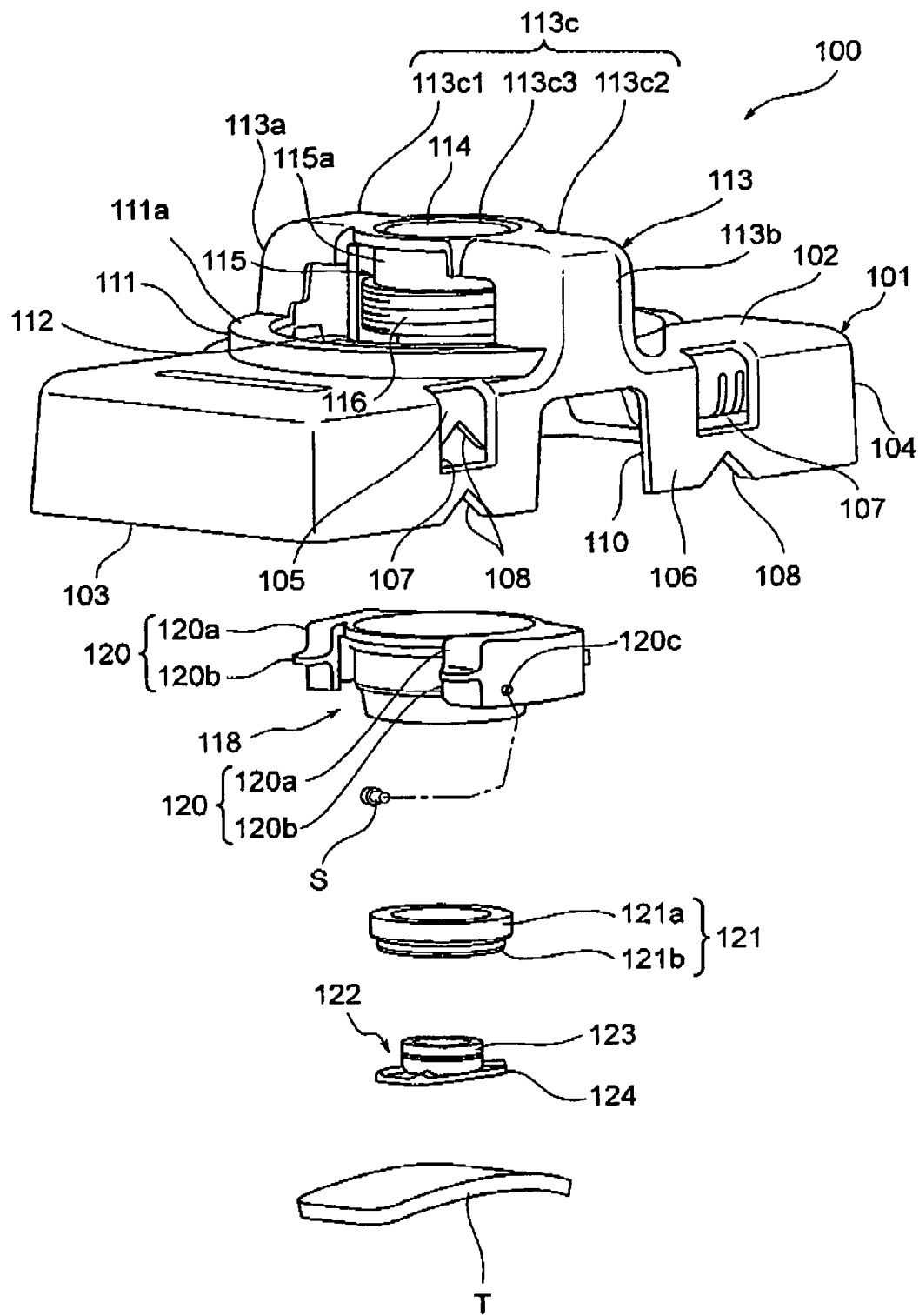
FIG. 6 is an exploded perspective view of the lens shape shown in FIGS. 5A to 5C.

The lens shape measuring apparatus includes a lens holder 100 having a main body 101 extending in right and left directions, as shown in FIGS. 5A to 5C and FIG. 6. As shown in FIG. 6, the main body 101 of the lens holder 100 includes an upper wall 102, end walls 103, 104 extending down from the edges in the longitudinal direction of the upper wall 102, and side walls 105, 106 extending downward from the side edges in the widthwise direction of the upper wall 102. With this constitution, the main body 101 of the lens holder 100 is opened downward.

(Holder's Holding Structure)

Figure 9:
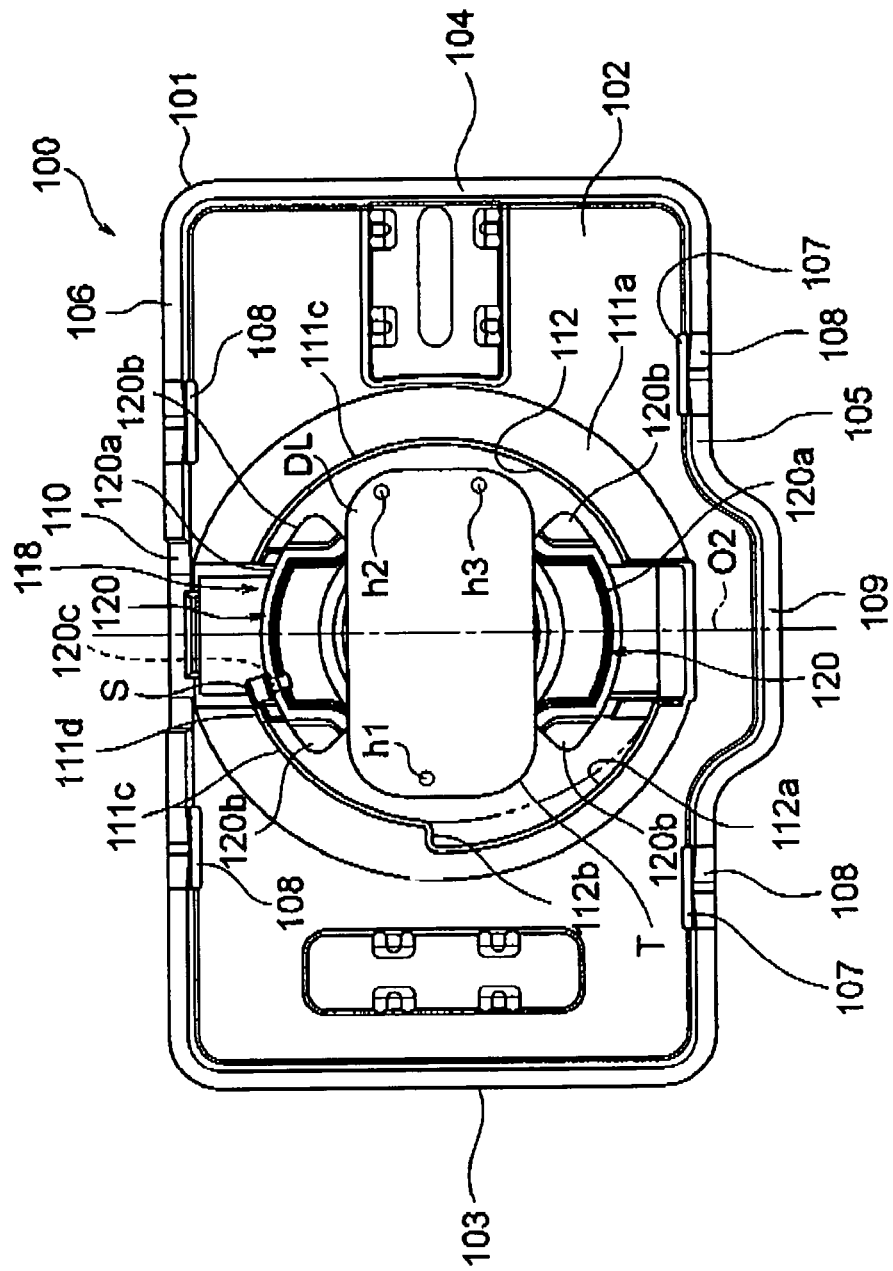
FIG. 9 is a planar view of the lens shown in FIG. 7 viewed from a bottom.
Figure 11A:
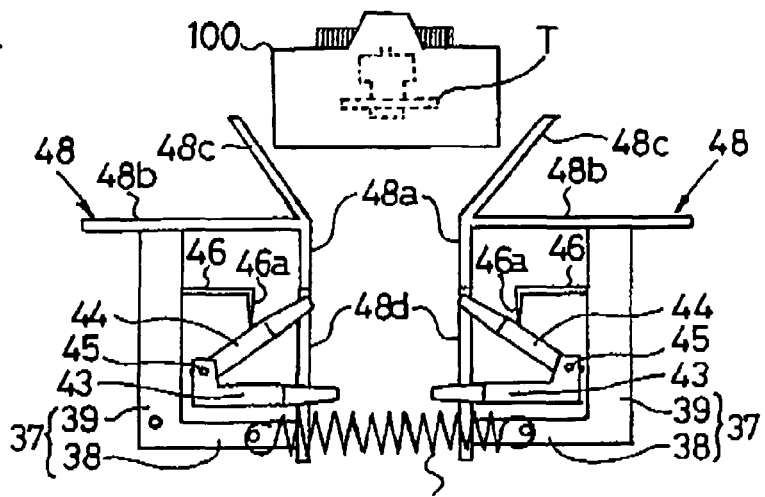
FIGS. 11A to 11C are views showing an operation when measuring the lens shape by using the lens shape measuring apparatus shown in FIG. 1 using the lens holder shown in FIG. 6.
Figure 11B:
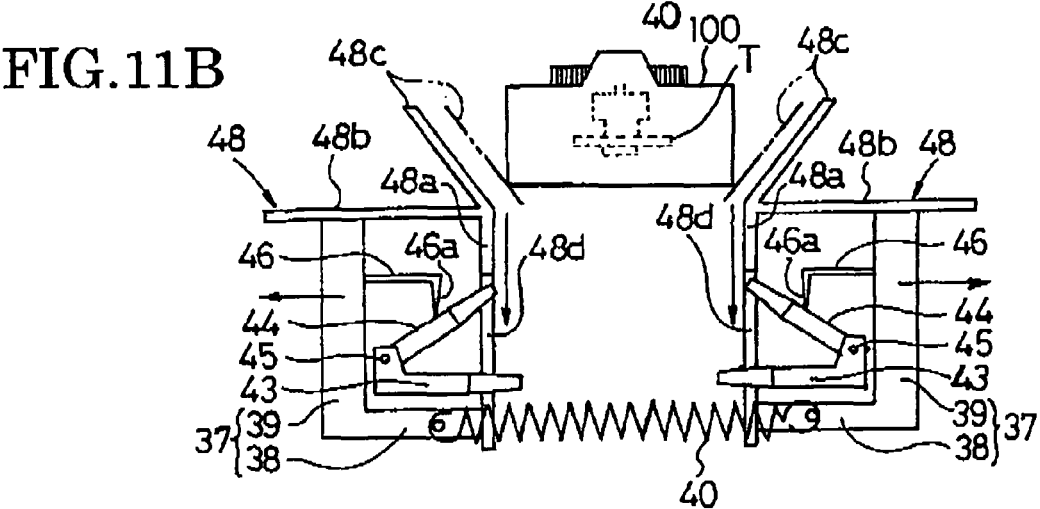
Figure 11C:
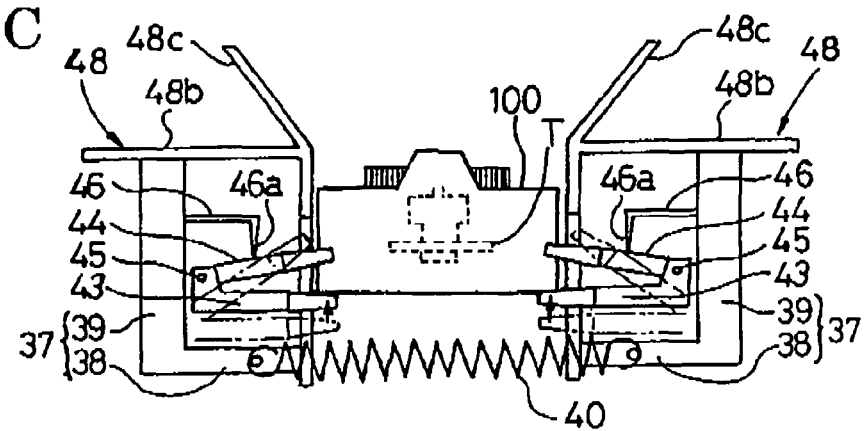

Further, a pair of insertion holes 107, 107 to insert the holding claws 43, 44 therethrough, as mentioned-above are formed along each of the side walls 105, 106 and the upper wall 102 as shown in FIG. 6, respectively. The insertion holes 107, 107 of each of the side walls 105, 106 are formed in a spaced manner along the longitudinal direction. The lower edge part of the side walls 105,106 are formed with V-shaped cut portions 108, 108, which are opened downward, corresponding to the insertion holes 107, 107 (see FIG. 6). When the lens holder 100 is inserted between the frame guide members 48, 48 as shown in FIG. 11 in the order of FIGS. 11A to 11C thereof, the cut portions as shown in FIGS. 6 and 9 are brought into engagement with the holding claws 43, 43. In this position, the holding claws 43, 44 are inserted through the insertion holes 107, 107 within the lens holder 100, thereby holding the lens holder 100 between the holding claws 43, 44 (holding bars).

Further, as shown in FIGS. 5 and 9, in the side wall 105 is formed a projection 109 for positioning, which is located in the center along the longitudinal direction and between the insertion holes 107, 107 and projects outwardly. The projection 109 is engaged with the cut portion 10d formed in the upper surface 10a of the main body 10 of the measuring apparatus as shown in FIG. 3, so that a situation to set the lens holder 100 in can be specified. The cut portion 10d is opened at the opening 10b and is formed corresponding to the space between the frame guiding members 48, 48 situated behind in FIG. 3.

In addition, the side wall 106 is formed with wide cut portions 110, 110 which are located in the center along the longitudinal direction of the lens holder 100 and between the insertion holes 107, 107, and opens downward as shown in FIG. 6. This cut portion 110 is used for confirmation to hold the lens T.

(Lens Holding Structure)

In addition, in a substantial center portion of the upper wall 102, a circular and cylindrical projection 111 is formed. An upper end of the projection 111 is formed with an annular and flange-like upper wall 111a. Inside of the upper wall 111a is formed a large diameter confirming hole 112 to confirm the attachment condition (clamping condition). As shown in FIG. 5, the confirming hole 112 is formed with an enlarged diameter portion 112a in which a part thereof gradually enlarges outwardly. At an enlarged end of the enlarged diameter portion 112a is formed a step portion 112b which directs toward the center of the holder 100.

In addition, in an inner edge of the upper wall 111a is formed a rib 111c which projects into the main body 101 of the holder 100, as shown in FIG. 9. The rib 111c is formed with a stopper portion 111d.

Further, on the upper wall 111a is formed a narrow knob portion 113 which projects upwardly and extends in the widthwise direction of the main body 101, as shown in FIG. 6. The knob portion 113 includes erecting portions 113a, 113b each of which protrudes upwardly from a part in the side of the side walls 105, 106 of the upper wall 111a, respectively, and a connecting (joining-together) portion 113c which connects upper ends of the erecting portions 113a, 113b so as to form a reversed U-like shape as viewed from a front.

In a center the longitudinal direction of the connecting portion 113c is formed a circular hole 114. Further, the connecting portion 113c includes supporting portions 113c1, 113c2 which are integral with erecting portions 113a, 113b, respectively, and supporting portions 113c3, 113c3 which are connected to the supporting portions 113c1, 113c2 and extends arcuately along the circular hole 114.

In addition, as shown in FIG. 5A, a center line O of the widthwise direction of the connecting portion 113c is interposed to pass through a center O1 of the projection 111 which is made circular and tube-like. Further, the erecting portions 113a, 113b and supporting portions 113c1, 113c2 of the connecting portion 113c have U-like shape cross-sections.

Figure 7:
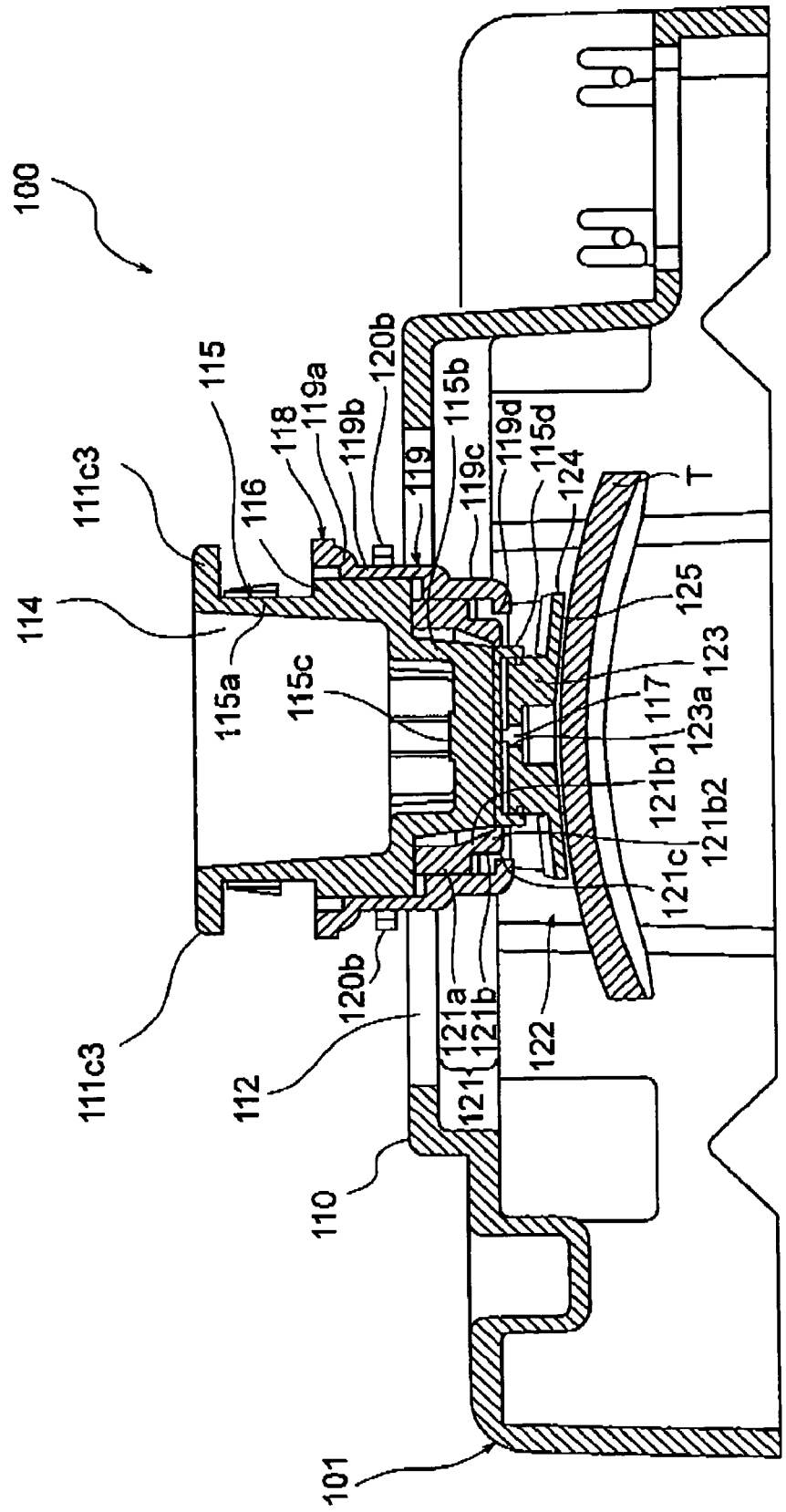
FIG. 7 is a cross-sectional view taken along the line A1-A1 of FIG. 5A.
Figure 8:
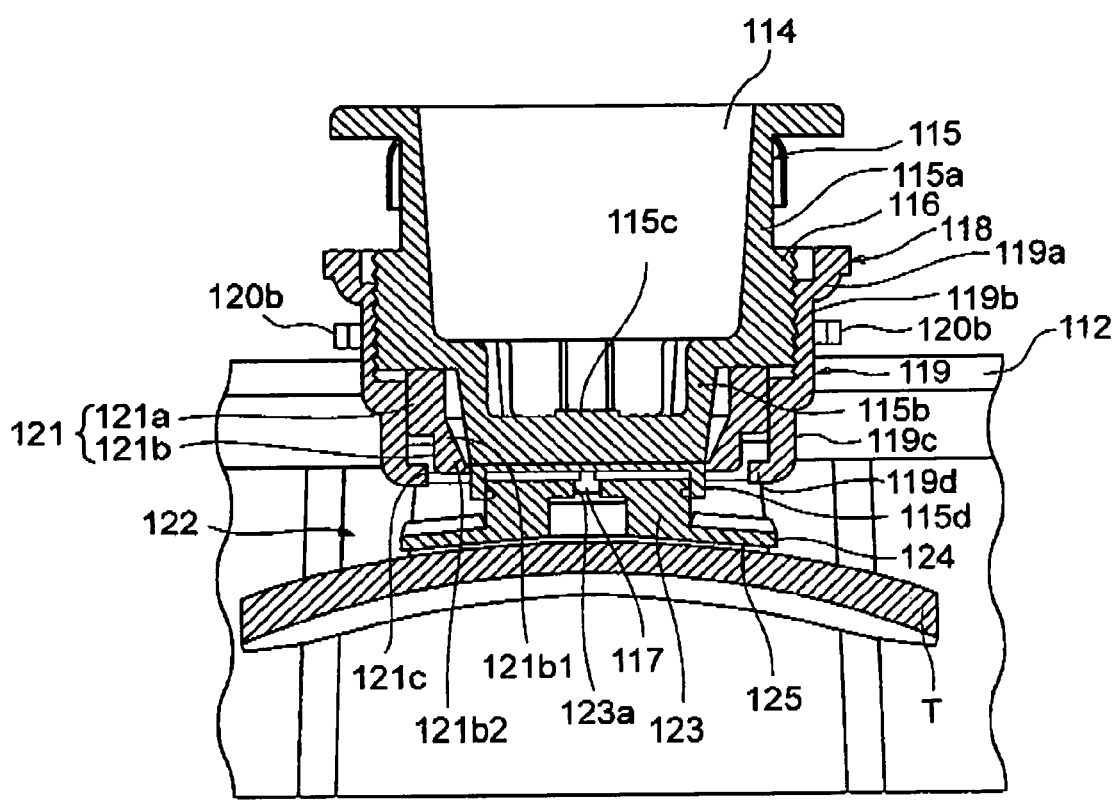
FIG. 8 is an enlarged cross-sectional view of a main part of the lens holder shown in FIG. 7.

Furthermore, in a center portion of the connecting portion 113c, as shown in FIGS. 7 and 8, is integrally formed a supporting portion 115 which is formed to a circular shape along a circular hole and extends downwardly into the main body 101 of the holder 100.

The supporting portion (tube) 115 includes a large diameter tube portion 115a provided in the middle portion in upward and downward directions, and a small diameter tube portion 115b connected to a lower end of the large diameter tube portion 115a. In an outer circumferential surface is formed a male screw tube portion 116 as shown in FIG. 8.

Further, in a bottom portion 115c of the small diameter portion 115b is integrally formed a shaft holding portion 115d connected to the small diameter tube portion 115b. In a bottom surface of the bottom portion 115c is integrally formed a rib-like positioning projection 117 which extends in a diametrical direction and a widthwise direction of the main body 101 of the holder 100. Additionally, the shaft holding cylinder 115d is formed with a cut-out slit (not shown) which extends down to a lower end thereof.

The lens holder 100 further includes a clamping member 118. The clamping member 118 includes a tube-like portion 119 concentric with the supporting tube portion 115, and a pair of operating portions 120, 120 provided in the tube-like portion 119, as shown in FIGS. 6 and 9.

The tube-like portion 119, as shown in FIGS. 7 and 8, includes a large diameter operating tube portion 119a provided on an upper end, an intermediate diameter female threaded tube portion 119b, a small diameter tube portion 119c connected to a lower end of the female threaded tube portion 119b, and a flange 119d connected to a lower end of the tube portion 119c and projecting toward a center side thereof. And, the male threaded tube portion 116 of the supporting tube portion 115 is screwed into the female threaded tube portion 119b.

Figure 10:
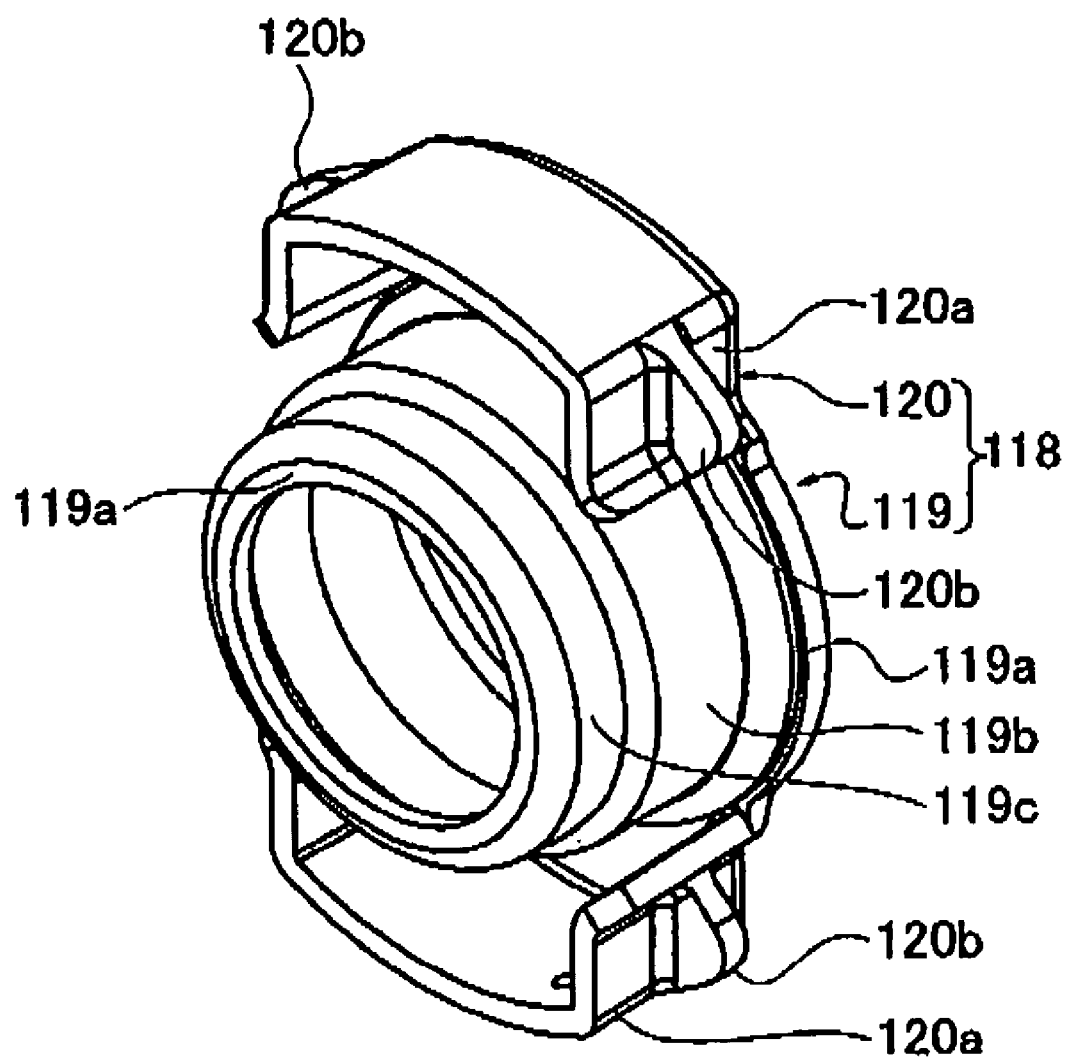
FIG. 10 is a perspective view of a clamping member shown in FIG. 6 viewed from another angle.

Further, in portions which are disposed in opposing sides with each other are formed the pair of operating portions 120, 120, as shown in FIG. 10. Each operating portion 120 includes a projecting operating portion 120a having a U-like shape when viewed from a bottom, and a triangular-shaped plate-like projection 120b. Additionally, the operating portion 120 includes the projecting operating portion 120a and the plate-like projection 120b is formed to have a butterfly-wing shape when viewed from a top. One of the operating portions 120, 120 is formed with a threaded hole 120 as shown in FIG. 6. A screw S as a stopper is screwed into the threaded hole 120 as shown in FIG. 9.

Further, a tube-like pushing member 121 is interposed between the small diameter tube portion 115b of the supporting tube portion 115 and the tube portion 119c of the clamping member 118. The tube-like pushing member 121 includes an engaging tube portion 121a which is rotatably engaged in an inner circumferential surface of the tube portion 119c, and a pushing tube portion 121b provided below the engaging tube portion 121a. The pushing tube portion 121b is curved toward the center side as an inner circumferential surface gradually goes to a lower end. With this construction, the pushing tube portion 121b is formed with a thin hinged portion 121b1 connected to the engaging tube portion 121a and a thick pushing portion 121b2 provided on a lower end thereof.

Further, in an outer circumferential surface of a lower end of the pushing tube portion 121b is formed a large R-shaped engaging portion 121c. Engaged in an intermediate portion in upper and lower directions is an inner edge of the flange 119d.

Further, the lens holder 100 includes a lens holding member (a lens shape mounting jig) 122, as shown in FIGS. 6 to 8. The lens holder 122 includes a mounting shaft portion 123 and a flange-shaped lens holding portion 124 integrally formed with the mounting shaft portion 123. In addition, the mounting shaft portion 123 is formed with a positioning slit 123a which engages the positioning projection 117, as shown in FIG. 8. Further, the lens is held on the lens holding portion 124 by a double-faced adhesive tape 125.

Additionally, in the embodiment, although the lens holding member 122 configured to hold the lens T on the lens-shaped holding portion 124 by way of a double-faced adhesive tape 125 is shown, it is not necessarily limited to this embodiment. For example, the lens holding portion 124 may be replaced with the lens shaped absorbing jig as the lens holding member. Further, the construction in which the positioning groove instead of the positioning slit 123a may be employed.

[Operation]

Now, operation of an apparatus for measuring the contour of a lens shape for an eyeglass frame of such a construction is described below.

In such a construction, in an initial position prior to starting a clamping operation, the flange 119d of the clamping member 118 engages the R-shaped engaging portion 121c of the tube-like pushing member 121 in a substantially center position in upward and downward directions as shown in FIG. 8, under the condition that the tube-like pushing member 121 does not clamp the shaft holding cylinder 115d of the supporting tube portion 115.

In this state, as shown in FIG. 9, the circumferential surfaces of the pair of operating portions 120, 120 of the clamping member 118 are directed toward the widthwise direction of the main body 101 of the holder 100. The widthwise center line O2 of the operating portions 120, 120 is set to be substantially perpendicular to the side walls 105, 106 of the main body 101 of the holder 100.

Additionally, the direction of the positioning projecting portion 117 extends in a widthwise direction of the main body 101 of the holder 100.

Here, other than the lens T, there may be used a template, a dummy lens or the like having holes h1 to h3 for mounting metal fittings of a rimless frame, as shown in FIGS. 5 and 9 and the like. If the lens T is held on the lens holding portion 124 by means of a double-faced adhesive tape 125, the holes h1 to h3 are substantially situated in a direction to which the positioning slit 123a extends.

Then, under the condition that the positioning slit 123a on the mounting shaft portion 123 of the lens holding member 122 is directed toward the widthwise direction of the main body 101 of the holder 100, the mounting shaft portion 123 is engaged with the shaft holding cylinder 115d of the supporting tube portion 115 while confirming the mounting shaft portion 123 through the cut-out portion 110. On this occasion, the positioning projection 117 within the shaft holding cylinder 115d is engaged with the positioning slit 123a of the mounting shaft portion 123 while slightly reciprocating the mounting shaft portion 123 around its axis.

In this state, although the mounting shaft portion 123 is slightly press-fitted into the shaft holding cylinder 115d, if an open end of the main body 101 of the holder 100 is directed downwardly, the mounting shaft portion 123 can not be pull out of the shaft holding cylinder 115d.

Further, in this state, when the main body 101 of the holder 100 is viewed from a top, it is possible to visibly confirm the holes h1 to h3 for mounting metal fittings of the lens T through the confirming hole 112 (i.e., the confirming hole 112 allows the holes h1 to h3 to be viewed).

From this state, if the pair of operating portions 120, 120 of the clamping member 118 are operatively pivoted through the confirming hole 112 as shown in FIG. 5B and then the pair of operating portions 120, 120 of the clamping member 118 is operatively rotated as shown in FIG. 5C, the screw as a stopper abuts against the stopper 111d. With this rotation, the clamping member 118 is moved toward an upward direction shown in FIG. 8 by way of the cooperating action of the female threaded tube portion 119b and the male threaded tube portion 116.

With this movement, the flange 119d of the clamping member 118 rises along the R-shaped engaging portion 121c, and thus the flange 119d is configured to press and move the engaging portion 121c toward the center side of the tube-like pushing member 121. On this occasion, the pressing portion 121b of the tube-like pressing member 121 is configured to press the shaft holding cylinder 115d to clamp the mounting shaft portion 123 to the shaft holding portion 115d.

Additionally, even in the state that the operating member 120, 120 of the clamping member 118 is rotated up to 180 degrees as shown in FIG. 5C, it is possible to visibly confirm the holes h1 to h3 for mounting metal fittings of the lens T through the confirming hole 112. Further, even if the clamping member 118 is operatively rotated, it is possible to operatively rotate the screw S up to 180 degrees, by disposing the screw S in a position where it does not abut against the flange 111c. In this case, a projection (a stopper projection) may be provided instead of the screw S as a stopper.

If the lens holder 100 is used as shown in FIG. 11, a not shown detecting device for detecting the lens shape detects the lens holder 100 and inputs detecting signals into a not shown arithmetic control circuit and then the arithmetic control circuit abuts a feeler used for a template (a measuring element used for a template) against a circumferential surface of the lens T to thereby measure a contour of the lens T. Since the construction of a feeler used for the template employs the same well-known construction as that disclosed in Japanese Patent Laid-Open No. 10-156685, a detailed explanation thereof is omitted. Additionally, a manually standing and falling feeler of common knowledge (the same well-known feeler as that disclosed in Japanese Patent Laid-Open No. 4-12215 for the template) may be employed without depending on such an automatic detection type feeler.

Figure 12A:
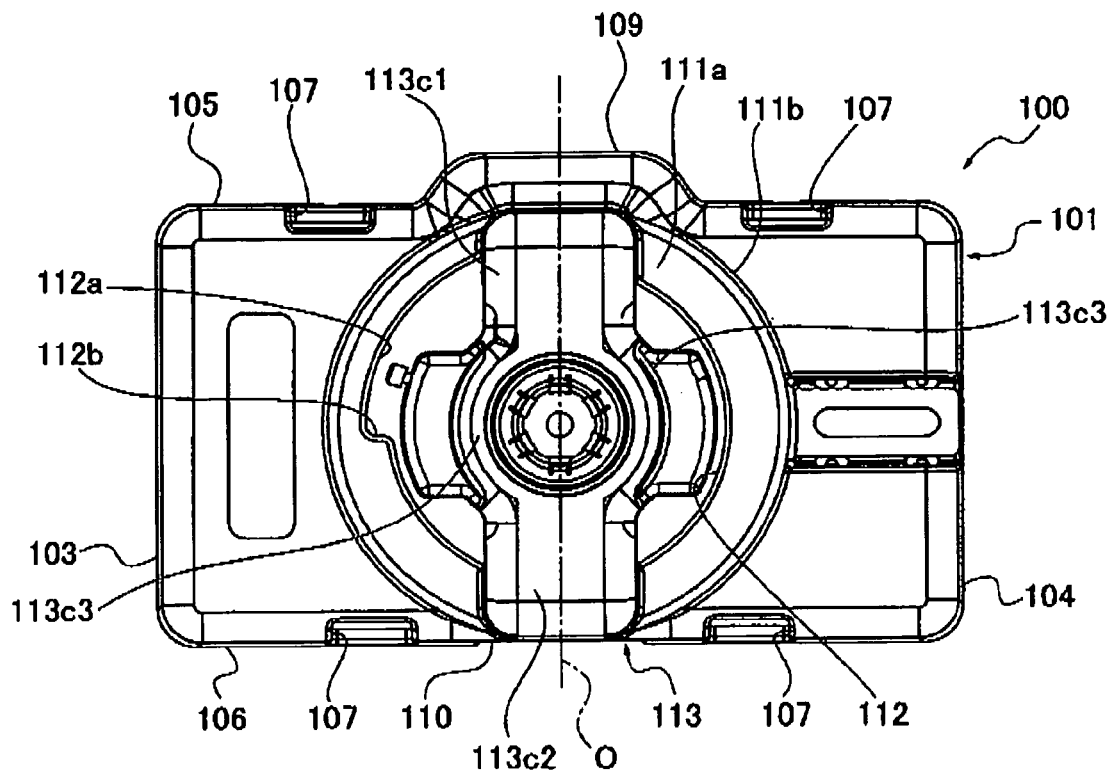
FIG. 12A is a plan view showing a variant of the lens holder according to this invention.
Figure 12B:
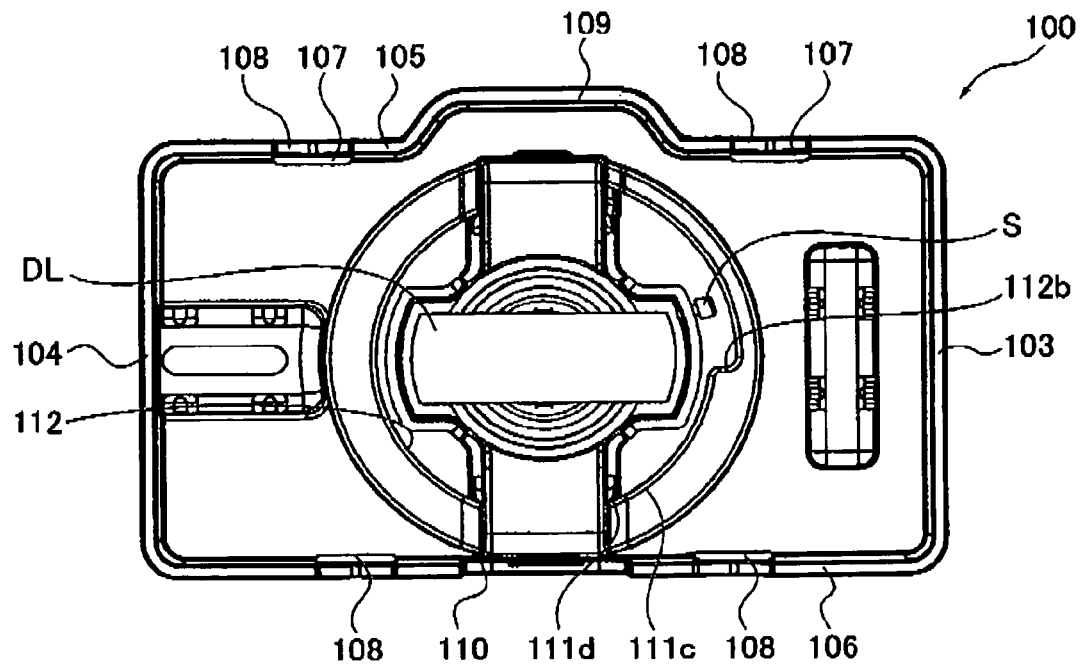
FIG. 12B is a planar view showing the lens holder of FIG. 12A viewed from a bottom.
Figure 13A:
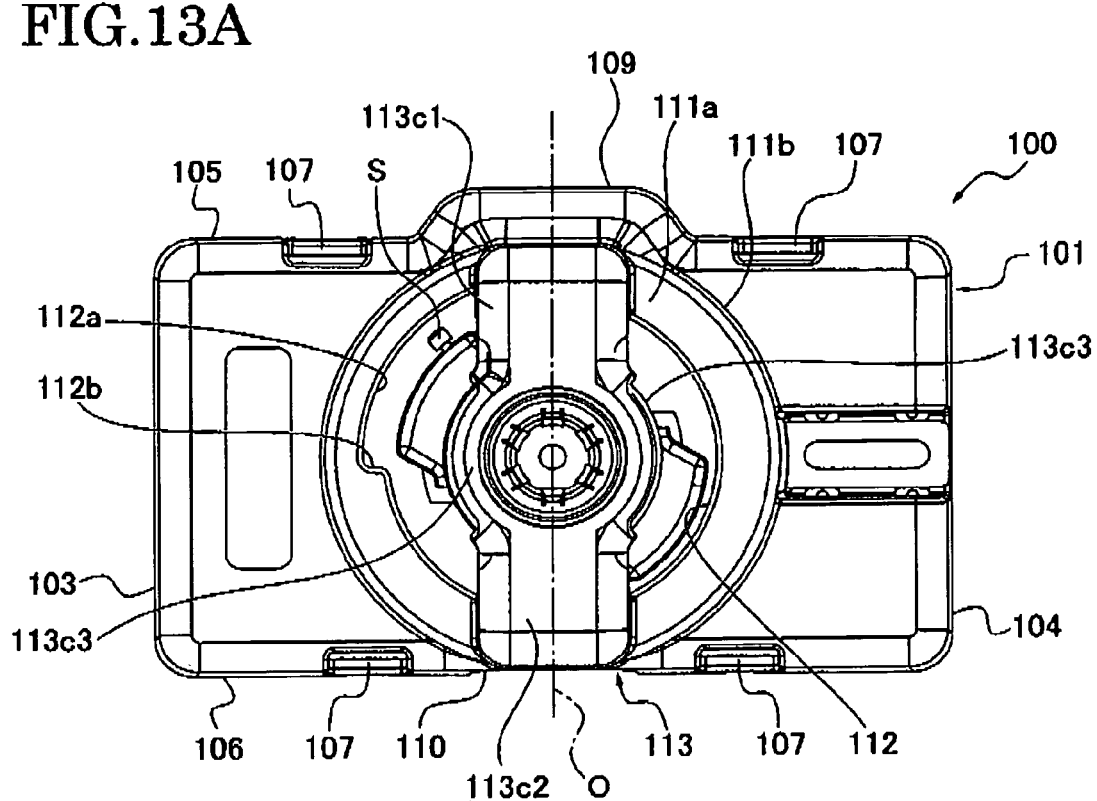
FIG. 13A is a planar view showing an operation of the lens holder shown in FIG. 12.
Figure 13B:
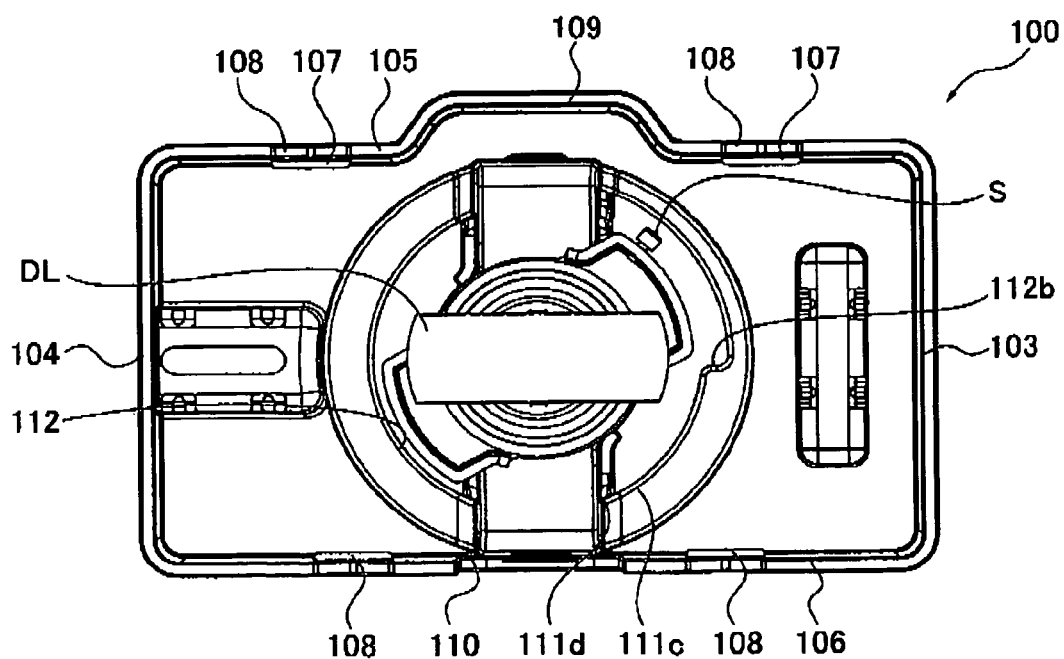
FIG. 13B is a planar view showing an operation of the lens holder of FIG. 14A viewed from a bottom.
Figure 14A:
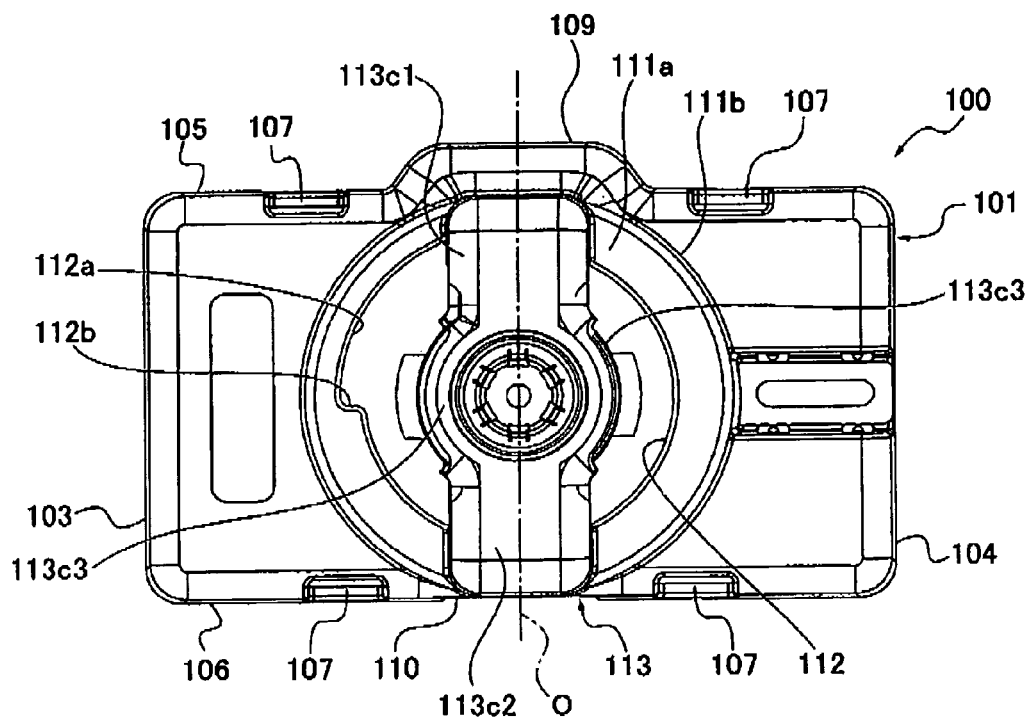
FIG. 14A is a plan view showing a variant of the lens holder according to this invention.
Figure 14B:
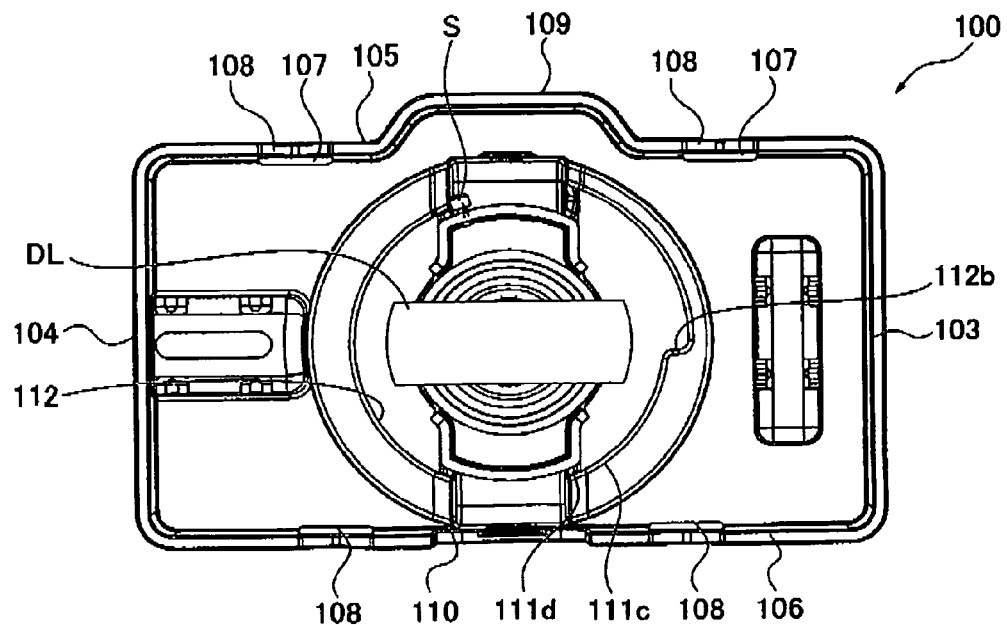
FIG. 14B is a plan view showing the lens holder of FIG. 12A viewed from a bottom.

Further, if the screw S is disposed inside the enlarged diameter portion 112a of the flange 111c, it is possible to pivot (rotate) the operating portions 120, 120 of the clamping portion 118 within a range of 90 degrees as shown in FIGS. 12 to 14. Additionally, a plate-like projection 120b of the operating portion 120 as mentioned above may be omitted as shown in FIGS. 12 to 14.

In the apparatus having this construction, the inclined guiding plate portions 48c, 48c of the frame guiding members 48, 48 are inclined in a direction of becoming more distant from one another as running upward. Thus, when the eyeglass frame MF of eyeglasses is set between the inclined guiding plate portions 48c, 48c as shown in FIG. 4A and then is pressed down from above against the force of the coil spring 40, the interval between the frame guiding members 48, 48, that is, that of the movable frameworks 37, 37, becomes wider by the guiding action of the inclined guiding plate portions 48c, 48c, so that the rim of the eyeglass frame MF (i.e., the lens frames LF, RF of the eyeglass frame MF), is moved onto the holding claws 43, 43 and is hooked thereon.

Figure 4C:
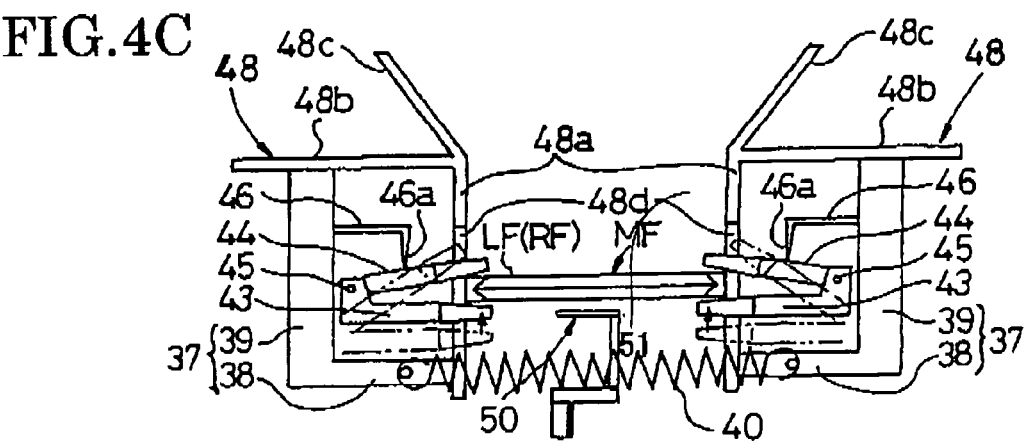

In such a state, when the operating lever 27 is turned from the position "opened" to the position "closed", this turning is transmitted to the barrel shaft 33 via the rotational shaft 25, the gears 26, 24, and the operational shaft 23, and a part of the spring 35 is wound around the barrel shaft 33. Thereby, the claw-attaching plate 42 is pivoted upwardly on the one side portion 42a via the wire 36 connected to the spring 35, and the interval of the holding hooks 43, 44 becomes closer as shown in FIG. 4C, and the rim of the eyeglass frame MF is held between the holding hooks 43, 44, as shown in FIG. 4C. In this position, the movable pin 31 is held on the lower end portion 20*a* of the circular-arc-shaped slit 20 by the force of the spring 32.

In order to remove the rim of the eyeglass frame MF (i.e., the lens frames LF, RI of the eyeglass frame MF) from between the holding claws 43, 44, the operating lever 27 is operated in an opposite way to the aforementioned operation, so that the constituent members are operated reversely.

As mentioned above, a mounting member for setting the lens shape to a frame holding mechanism when detecting the two-dimensional lens shape of a rimless frame or hole positions of a dummy lens used for sports, that is, a member to clamp the lens shape by means of a screw mechanism for holding the lens shape, the clamping member is shaped (i.e., has a confirming hole) to enable the hole positions to be correctly looked at in the face (viewed) when the clamping member completes its clamping operation.

As mentioned above, the lens shape measuring apparatus is adapted to measure a contour of a circumferential edge of the lens which is held on the lens holder 100 by way of a measuring element used for the lens T to thereby obtain the information concerning the lens shape. The lens holder 100 includes a lens holding member 122 for holding the lens shape in which holes for mounting metal fittings of a rimless frame or a dummy lens are formed, a main body 101 of the holder 100 which opens downward, a shaft holding cylinder 115*d* which is located in the main body 101 of the holder 100, and engages and holds the mounting shaft portion 123 of the lens holding member 122, a clamping member 118 in which the shaft holding cylinder is clamped against and fixed to the mounting shaft portion 123 of the lens holding member 122. Further, when the shaft holding cylinder 115*d* is clamped against and fixed to the mounting shaft portion 123 of the lens holding member 122 by the clamping member 118, confirming holes each having a predetermined shape to look in the holes h1 to h3 of the lens T in the face are formed to the main body 101 of the holder 100.

With this arrangement, an apparatus can be provided for measuring the positions of the holes by allowing the user to look at the holes h1 to h3 of the lens T in the face, and by automatically measuring the positions of the holes. Therefore, it is possible to correctly detect the positions of the holes.

Further, the clamping member 118 of the lens shape measuring apparatus has a graspable butterfly shape. With this arrangement, since the clamping member 118 has a butterfly shape such that two fans are attached with apexes thereof facing one another, it is possible for a user to grasp them easily. Thus, the clamping member 118 fits the user hand perfectly, when clamping operation is performed. Herein, threaded portions may be adjusted so as not to cover the holes of the lens shape when the clamping operation is performed.

According to this arrangement of the present invention, the lens shape measuring apparatus enables the user to measure the positions of the holes by looking in the holes of the lens shape in the face, and enables the apparatus to automatically measure the positions of the holes. Thus, it is possible to correctly detect the positions of the holes.

Although the preferred embodiments of the present invention have been described, it should be understood that the present invention is not limited to these embodiments, and various modifications and changes can be made to the embodiments.

What is claimed is:

1. A lens holder, comprising:
a lens holding member including a mounting shaft portion and configured to hold a lens having at least one hole for mounting a fitting of a rimless frame or to hold a dummy lens having at least one hole;
a shaft holding cylinder configured to hold the mounting shaft portion of the lens holding member;
a clamping member configured to clamp the shaft holding cylinder to the mounting shaft portion of the lens holding member; and
a main body having an opened bottom surface and at least one confirming hole, the main body housing the lens holding member and the shaft holding cylinder therein, and the main body being configured to house the lens or the dummy lens held by the lens holding member therein,
wherein the lens holding member, the shaft holding cylinder, the clamping member, and the main body are arranged and configured such that, when the shaft holding cylinder is clamped to the mounting shaft portion of the lens holding member by the clamping member while the lens holding member is holding the lens or the dummy lens, the confirming hole of the main body allows the at least one hole of the lens or the dummy lens to be visually confirmed through the confirming hole from a viewing position above the main body.

2. The lens holder according to claim 1, wherein the lens holding member includes a lens holding portion configured to attach the lens thereto by a double-faced adhesive tape.

3. The lens holder according to claim 1, wherein the clamping member has a graspable butterfly shape.

4. A lens shape measuring apparatus, comprising:
a lens holder configured to hold a lens to be measured; and
a measuring device configured to measure a contour of a lens held by the lens holder and obtain lens shape data,
wherein the lens holder includes:
a lens holding member including a mounting shaft portion and configured to hold the lens having at least one hole for mounting a fitting of a rimless frame or to hold a dummy lens having at least one hole;
a shaft holding cylinder configured to hold the mounting shaft portion of the lens holding member;
a clamping member configured to clamp the shaft holding cylinder to the mounting shaft portion of the lens holding member; and
a main body having an opened bottom surface and at least one confirming hole, the main body housing the lens holding member and the shaft holding cylinder therein, and the main body being configured to house the lens or the dummy lens held by the lens holding member therein,
wherein the lens holding member, the shaft holding cylinder, the clamping member, and the main body are arranged and configured such that, when the shaft holding cylinder is clamped to the mounting shaft portion of the lens holding member by the clamping member while the lens holding member is holding the lens or the dummy lens, the confirming hole of the main body allows the at least one hole of the lens or the dummy lens to be visually confirmed through the confirming hole from a viewing position above the main body.

* * * * *